US008105193B2

(12) United States Patent
Oseto et al.

(10) Patent No.: US 8,105,193 B2
(45) Date of Patent: Jan. 31, 2012

(54) BICYCLE REAR DERAILLEUR

(75) Inventors: Shinya Oseto, Osaka (JP); Hajime Nagasawa, Osaka (JP); Satoru Kunisawa, Osaka (JP)

(73) Assignee: Shimano Inc., Osaka (JP)

( * ) Notice: Subject to any disclaimer, the term of this patent is extended or adjusted under 35 U.S.C. 154(b) by 643 days.

(21) Appl. No.: 12/249,023

(22) Filed: Oct. 10, 2008

(65) Prior Publication Data

US 2010/0093472 A1 Apr. 15, 2010

(51) Int. Cl.
*F16H 9/00* (2006.01)

(52) U.S. Cl. ........................................ 474/82; 474/144

(58) Field of Classification Search ............. 474/78–82, 474/144

See application file for complete search history.

(56) References Cited

U.S. PATENT DOCUMENTS

| | | | | |
|---|---|---|---|---|
| 5,836,844 | A | 11/1998 | Yoshida | |
| 6,685,586 | B2 | 2/2004 | Dal 'Pra | |
| 6,949,040 | B2 | 9/2005 | Ando | |
| 2006/0135301 | A1 * | 6/2006 | Shahana | 474/82 |
| 2007/0026985 | A1 * | 2/2007 | Yamaguchi | 474/82 |

* cited by examiner

*Primary Examiner* — Emmanuel M Marcelo

(74) *Attorney, Agent, or Firm* — Global IP Counselors, LLP

(57) ABSTRACT

A bicycle rear derailleur is basically provided with a base member, a movable member and a moving mechanism. The movable member pivotally supports a chain guide. The moving mechanism is coupled between the base member and the movable member so that the movable member is movable relative to the base member. The chain guide includes a first guide plate, a second guide plate, a guide pulley rotatably disposed between the first and second guide plates and a tension pulley rotatably disposed between the first and second guide plates. The first and second guide plates are releasably coupled together by a tool-less connection.

26 Claims, 10 Drawing Sheets

BICYCLE REAR DERAILLEUR

BACKGROUND OF THE INVENTION

1. Field of the Invention

This invention generally relates to a bicycle rear derailleur. More specifically, the present invention relates to a chain guide of a bicycle rear derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. It is desirable in the bicycle industry to make bicycle components (e.g., a rear derailleur) as light as possible. However, it is often difficult to reduce the weight of the bicycle components without also reducing the durability of the bicycle component.

One component that has been extensively redesigned in order to reduce weight is the bicycle rear derailleur. Typically, a rear derailleur has a base member and a movable member with a chain guide movably coupled to the base member via a linkage assembly (e.g., a moving mechanism). The base member is typically coupled to the rear triangle of the bicycle frame by a bolt that forms a B-axle for providing limited rotation with respect to the bicycle frame. The chain guide typically includes a pair of guide plates that rotatably support a guide pulley and a tension between the guide plates. The chain guide is typically coupled to the movable member by a shaft that forms a P-axle for providing limited rotation of the chain guide with respect to the movable member. The linkage assembly typically includes a pair of pivotal links pivotally coupled to both the base member and the movable member. A spring typically biases the chain guide to an innermost or outermost position relative to the rear sprockets. A bowden-type control cable with an outer sheath and an inner wire is typically coupled between the rear derailleur and a conventional shift control device. Thus, the chain guide can be moved laterally by moving the linkage assembly via the inner wire. Pulling the inner wire moves the chain guide against the biasing force of the spring, while releasing the inner wire causes the chain guide to move due to the biasing force of the spring.

In view of the above, it will be apparent to those skilled in the art from this disclosure that there exists a need for an improved bicycle rear derailleur. This invention addresses this need in the art as well as other needs, which will become apparent to those skilled in the art from this disclosure.

SUMMARY OF THE INVENTION

One object of the present invention is to provide a chain guide of a bicycle rear derailleur that is relatively lightweight, but that does not sacrifice strength.

Another object of the present invention is to provide a chain guide of a bicycle rear derailleur that has improved rigidity.

The foregoing objects can basically be attained by providing a bicycle rear derailleur that comprises a base member, a movable member and a moving mechanism. The movable member pivotally supports a chain guide. The moving mechanism is coupled between the base member and the movable member so that the movable member is movable relative to the base member. The chain guide includes a first guide plate, a second guide plate, a guide pulley rotatably disposed between the first and second guide plates and a tension pulley rotatably disposed between the first and second guide plates. The first and second guide plates are releasably coupled together by a tool-less connection.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
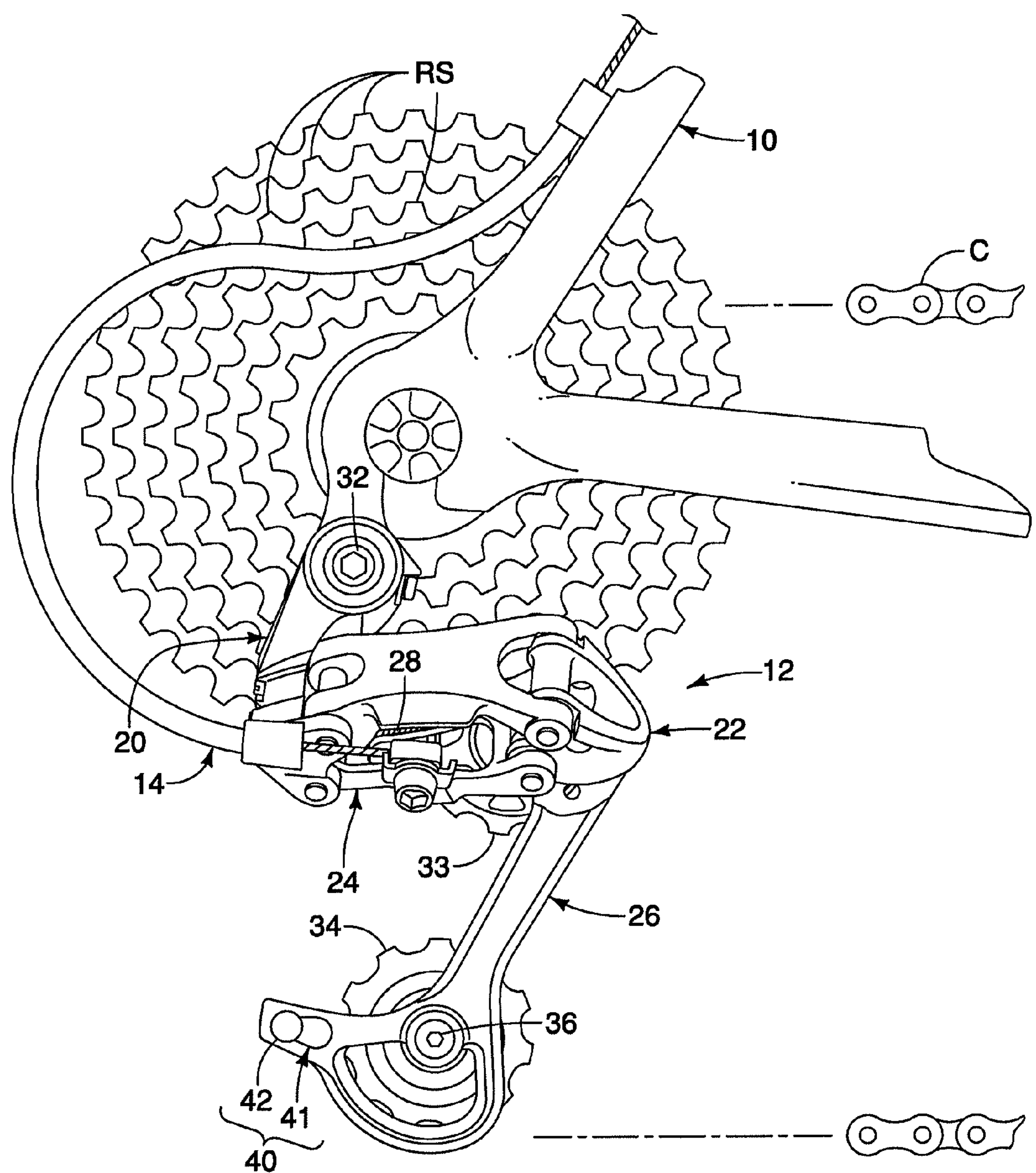
FIG. 1 is an outside elevational view of a rear portion of a bicycle having a rear derailleur mounted thereto in accordance with a first embodiment.

Referring initially to FIG. 1, a rear portion of a bicycle frame 10 is illustrated having a rear derailleur 12 mounted thereto in accordance with preferred embodiments. The rear fork or triangle of the bicycle frame 10 has a rear gear assembly (cassette) having multiple rear gears or sprockets RS rotatably coupled thereto via the rear hub (not shown). A chain C is received on the rear sprockets RS and is operatively coupled to a set of front gears or sprockets (not shown) in a conventional manner for transmitting the desired rotational torque to the rear wheel of the bicycle in a conventional manner. The rear derailleur 12 is coupled to a rear derailleur shifting mechanism (not shown) via a rear shift wire or shift cable 14 in a conventional manner. More specifically, the rear derailleur 12 is illustrated as low-normal type that is designed to be normally biased inwardly such that the chain C is normally positioned on the innermost (largest) gear or sprocket RS. Thus, when the rider actuates the rear derailleur shifting mechanism to pull the cable 14, the rear derailleur 12 moves the chain C outwardly to engage the next smaller gear. On the other hand, when the rider actuates the rear derailleur shifting mechanism (not shown) to release the cable 14, the rear derailleur 12 moves the chain C inwardly to engage the next larger gear. However, it will be apparent to those skilled in the art from this disclosure that the rear derailleur 12 could be a top-normal type if needed and/or desired.

As seen in FIG. 1, the rear derailleur 12 constitutes a bicycle component that basically includes a base member 20, a movable member 22, a linkage assembly 24, a chain guide 26, and a main biasing member 28. The base member 20 is pivotally attached to the bicycle frame 10 by a B-axle 32 for limited pivotal movement about a B-axis (labeled B in FIG. 2) in a conventional manner. While the rear derailleur 12 is illustrated as mechanically operated (i.e., cable actuated) component, it will be apparent to those skilled in the art from this disclosure that the chain guide 26 can be employed in other types of derailleurs such as motorized/electrical derailleurs, electromechanical derailleurs or pneumatic derailleurs. Thus, the linkage assembly is only one form of a moving mechanism for moving the movable member 22 and the chain guide 26 relative to the base member 20.

The chain guide 26 is coupled to the movable member 22 for limited pivotal movement about a P-axis (labeled P in FIG. 2), which is parallel to the B-axis. In the illustrated embodiment, the biasing member 28 is coupled between the base member 20 and the movable member 22 of the rear derailleur 12 such that the chain guide 26 is normally biased laterally inwardly toward the largest rear sprocket RS. The movement of the chain guide 26 is diagrammatically illustrated in double dashed broken lines in FIG. 2.

Figure 2:
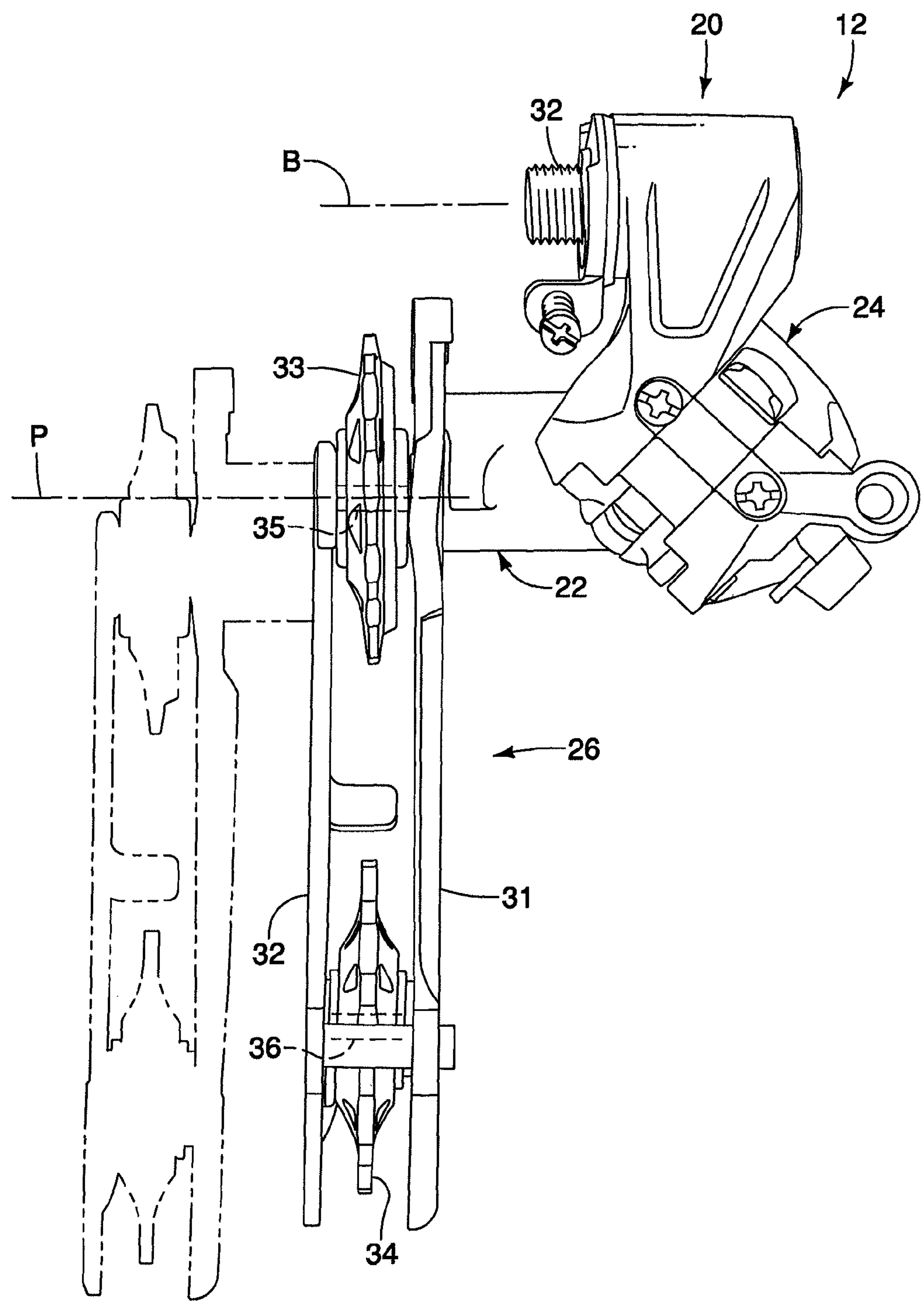
FIG. 2 is an enlarged rear elevational view of the rear derailleur illustrated in FIG. 1 in accordance with the first embodiment.
Figure 3:
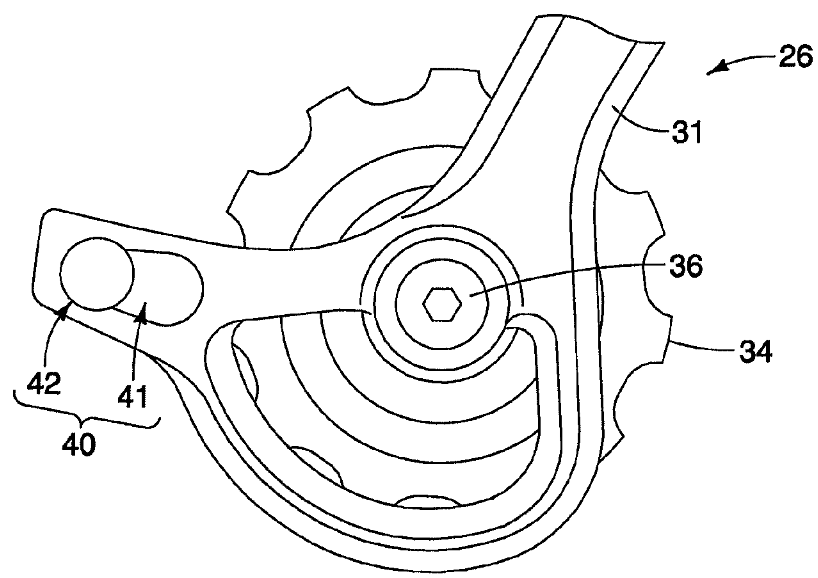
FIG. 3 is an enlarged, partial outside elevational view of a lower portion of the chain guide of the rear derailleur illustrated in FIG. 1 in accordance with the first embodiment.
Figure 4:
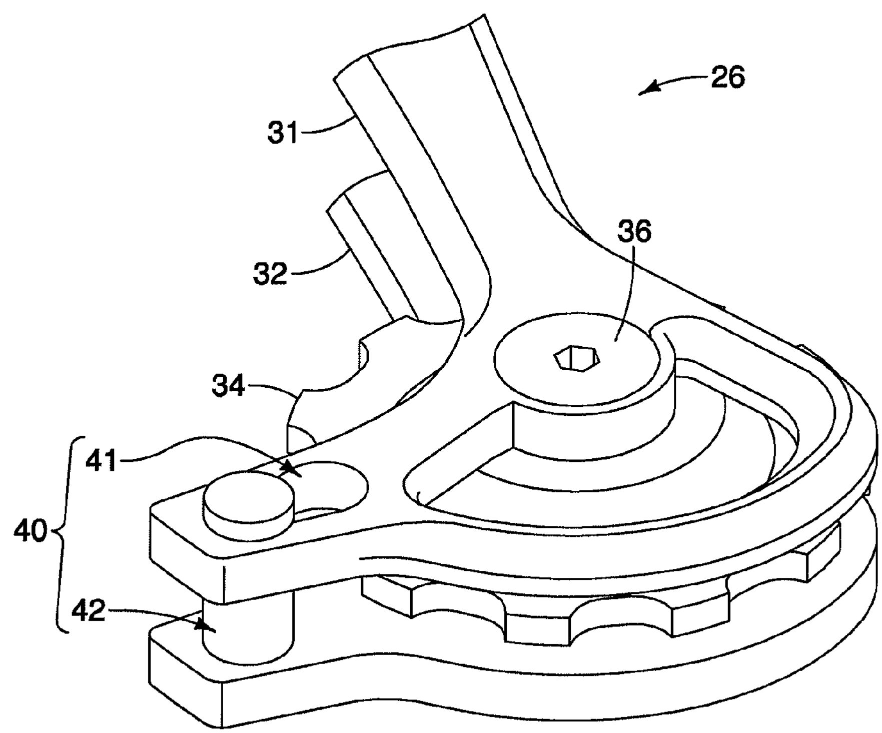
FIG. 4 is a perspective view of the lower portion of the chain guide illustrated in FIG. 3 in accordance with the first embodiment.

As seen in FIG. 2, the chain guide 26 basically has an outer or first guide plate 31, an inner or second guide plate 32, a guide sprocket or pulley 33 and a tension sprocket or pulley 34. The first and second guide plates 31 and 32 are primarily formed of a non-metallic material. Preferably, the first and second guide plates 31 and 32 are formed of a carbon fiber reinforced plastic. The guide pulley 33 is rotatably disposed between upper ends of the first and second guide plates 31 and 32. The tension pulley 34 is rotatably disposed between lower ends of the first and second guide plates. The first and second guide plates 31 and 32 are coupled together by first and second thread fasteners 35 and 36, respectively, that are disposed at rotational axes of the guide pulley 33 and the tension pulley 34, respectively. The guide pulley 33 and the tension pulley 34 engage the chain C in a conventional manner.

As seen in FIGS. 3 to 6, the first and second guide plates 31 and 32 are also releasably coupled together by a tool-less connection 40 disposed adjacent a peripheral edge of the tension pulley 34. Normally two guide plates are not directly coupled to each other at a location other than two pulley center positions. The tool-less connection 40 improves (increases) the rigidity of the first and second guide plates 31 and 32, which are preferably non-metallic plates formed of plastic material that is preferably reinforced with carbon fibers.

The term "tool-less connection" as used herein means a connection between two guide plates that remains firmly connected while the derailleur is being used during riding of the bicycle. In other words, a hand tighten threaded (screw) connection is not be a "tool-less connection" since normal vibration occurring during operation of the derailleur would cause a hand tighten threaded connection to loosen and no longer firmly hold the two guide plates together. The term "releasably" as used herein to modify the term "coupled" or other similar terms referring to a connection means that the connection between two guide plates can be repeatedly connected together and repeating disassembled without significantly damaging the connection or requiring repair of the connection.

The tool-less connection 40 of this embodiment basically includes an opening 41 formed in the first guide plate 31 and a connecting member 42 fixed to the second guide plate 32. The opening 41 formed in the first guide plate 31 is an elongated slot that narrows in width as the slot extends from a first wide end to a second narrow end. This tool-less connection 40 is also a quick coupling connection since the first and second guide plates 31 and 32 can be quickly connected together by the tool-less connection 40 with a relatively few number of movements.

Figure 5:
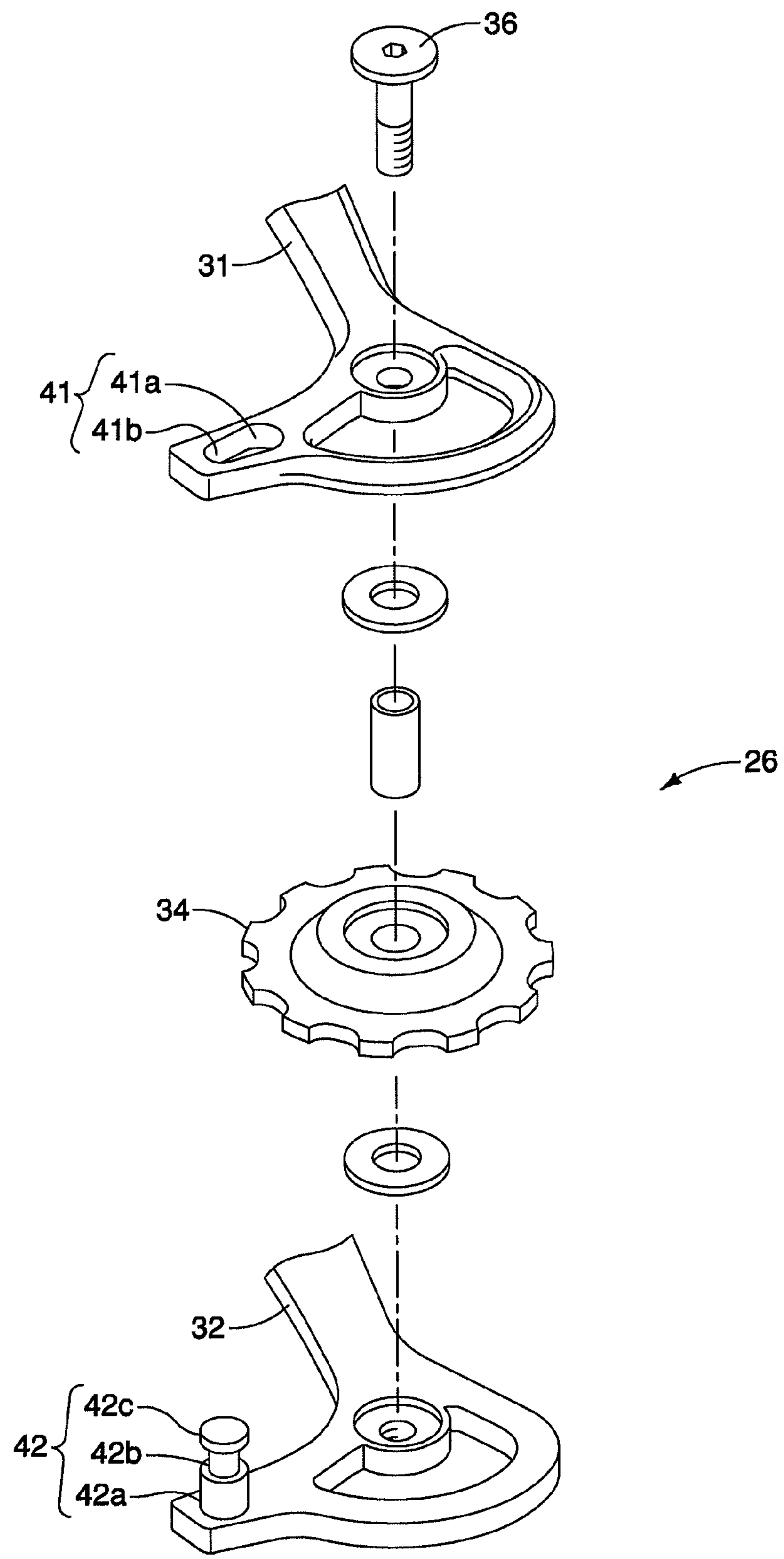
FIG. 5 is an exploded perspective view of the lower portion of the chain guide illustrated in FIGS. 3 and 4 in accordance with the first embodiment.
Figure 6:
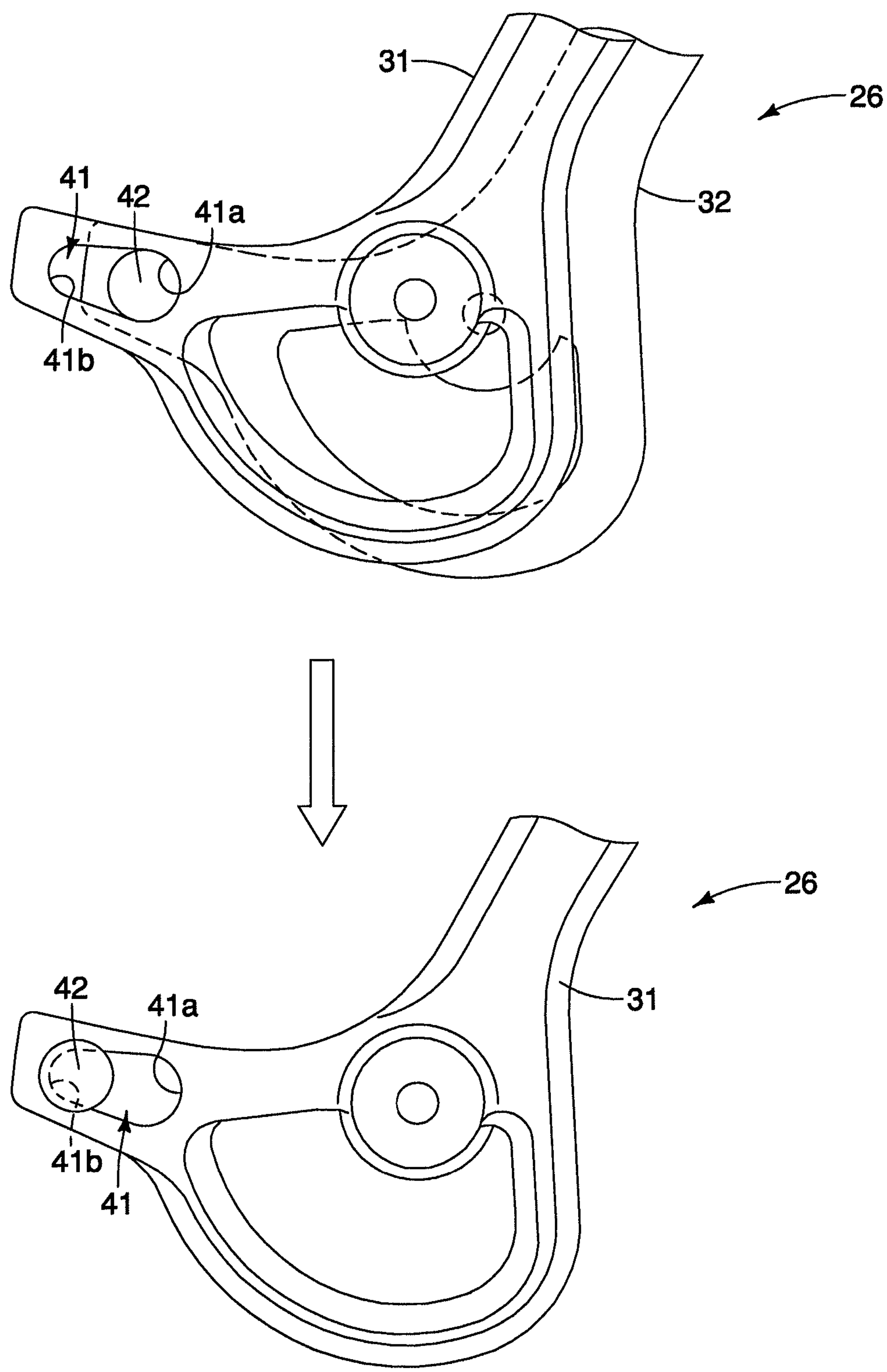
FIG. 6 is a pair of outside elevational views showing assembling the lower portion of the chain guide illustrated in FIGS. 3 to 5 in accordance with the first embodiment.

In particular, as seen in FIGS. 5 and 6, the opening 41 formed in the first guide plate 31 includes an installation/detachment portion 41*a* disposed at the first wide end of the opening 41, and a retaining portion 41*b* disposed at the second narrow end of the opening 41. As seen in the upper view of FIG. 6, the installation/detachment portion 41*a* is dimensioned to provide for easy insertion and detachment of the connecting member 42. Thus, the position of the first and second guide plates 31 and 32 shown in the upper view of FIG. 6 constitutes a first orientation in which the connecting member 42 that is fixed to the second guide plate 32 can be easily inserted into and removed from the installation/detachment portion 41*a* of the opening 41. Preferably, the installation/detachment portion 41*a* has a first transverse dimension that allow for easily insertion and removal of the connecting member 42 by movement in an axial direction of the connecting member 42, when the first and second guide plates 31 and 32 are in the first orientation.

As seen in the lower view of FIG. 6, the retaining portion 41*b* is dimensioned to prevent axially removal of the connecting member 42 from the retaining portion 41*b* of the opening 41 when the chain guide 26 is in an assembled state. Thus, the position of the first and second guide plates 31 and 32 shown in the lower view of FIG. 6 constitutes a second orientation in which the connecting member 42 that is fixed to the second guide plate 32 is prevented from being axially removed from the retaining portion 41*b* of the opening 41. Preferably, the retaining portion 41*b* has a second transverse dimension that prevents removal of the connecting member 42 from the retaining portion 41*b* of the opening 41 by movement in an axial direction of the connecting member 42, when the first and second guide plates 31 and 32 are in the second orientation.

As seen in FIG. 5, the connecting member 42 of this embodiment is in the form of metallic pin, which is fixed to the second guide plate 32 and releasably connected to the first guide plate 31. In other words, in this embodiment, the connecting member 42 is a separate member that is fixed to the second guide plate 32. The connecting member 42 can be permanently fixed to the second guide plate 32 by riveting or the like. Alternatively, the connecting member 42 can be releasably fixed to the second guide plate 32 by a threaded connection or the like. The connecting member 42 is preferably formed of a hard rigid material such as a lightweight metallic material. Thus, the connecting member 42 is preferably formed of a different material from the second guide plate 32 in this embodiment.

In addition to improving rigidity between the first and second guide plates 31 and 32, the connecting member 42 also functions as chain dropping off preventing member. As seen in FIG. 5, the connecting member 42 of this embodiment basically includes a spacer section 42*a*, a reduced width section 42*b*, and an enlarged width section 42*c*. The connecting member 42 of this embodiment also includes a fixed section (not shown) that is fixed with in a bore in the second guide plate 32. The fixed section (not shown) can be deformed to be riveted on to the second guide plate 32 or can be threaded into the bore in the second guide plate 32.

The reduced width section 42*b* and the enlarged width section 42*c* form an attachment portion of the connecting member 42 that is releasably retained in the opening 41 formed in the first guide plate 31, when the chain guide 26 is completely assembled. The attachment portion of the connecting member 42 is freely insertable and removable from the installation/detachment portion 41*a* of the opening 41 formed in the first guide plate 31 when the first and second guide plates 31 and 32 are in the first orientation with respect to each other. Also the attachment portion of the connecting member 42 is retained in the retaining portion 41*b* of the opening 41 formed in the first guide plate 31 when the first and second guide plates 31 and 32 are in the second orientation.

In any case, the spacer section 42*a* is disposed between inside facing surfaces of the first and second guide plates 31 and 32 so as to prevent the first and second guide plates 31 and 32 being moved towards each other. In other words, the spacer section 42*a* contacts the inside facing surfaces of the first and second guide plates 31 and 32.

The first guide plate 31 is located within the reduced width section 42*b* when the chain guide 26 is in an assembled state. In other words, the reduced width section 42*b* is dimensioned and arranged to accommodate the first guide plate 31 when the chain guide 26 is completely assembled. In this embodiment, the reduced width section 42*b* is formed by an annular groove between the spacer section 42*a* and the enlarged width section 42*c*. Accordingly, during assembly and disassembly of the chain guide 26, the reduced width section 42*b* provides for movement of the attachment portion (i.e., the reduced width section 42*b* and the enlarged width section 42*c*) of the connecting member 42 within the opening 41 formed in the first guide plate 31. The reduced width section 42*b* is equal in width (diameter) to the retaining portion 41*b* of the opening 41 formed in the first guide plate 31.

The enlarged width section 42*c* is disposed on an outside facing surface of the first guide plate 31 to prevent axially removal of the attachment portion of the connecting member 42 from the opening 41 formed in the first guide plate 31 when the chain guide 26 is in an assembled state. In other words, the enlarged width section 42*c* contacts an outer surface of the first guide plate 31, when the chain guide 26 is completely assembled. In particular, the enlarged width section 42*c* has a larger width (diameter) than the reduced width section 42*b*. Thus, the retaining portion 41*b* and the enlarged width section 42*c* are dimensioned to retain the attachment portion of the connecting member 42 within the retaining portion 41*b* of the opening 41 formed in the first guide plate 31 when the first and second guide plates 31 and 32 are in the second orientation as seen in the lower part of FIG. 6. The enlarged width section 42*c* is equal in width (diameter) or slightly smaller in width to the installation/detachment portion 41*a* of the opening 41 formed in the first guide plate 31. This allows the attachment portion (i.e., the reduced width section 42*b* and the enlarged width section 42*c*) of the connecting member 42 to be inserted and removed from the installation/detachment portion 41*a* of the opening 41 formed in the first guide plate 31.

During assembly of the chain guide 26, the first and second guide plates 31 and 32 are first coupled together by the tool-less connection 40 as discussed above. Then, the guide pulley 33 and the tension pulley 34 are inserted between the first and second guide plates 31 and 32. Now, the guide pulley 33 and the tension pulley 34 are attached to the first and second guide plates 31 and 32 by the first and second thread fasteners 35 and 36. Thus, the first and second guide plates 31 and 32 are secured together at three points.

Figure 7:
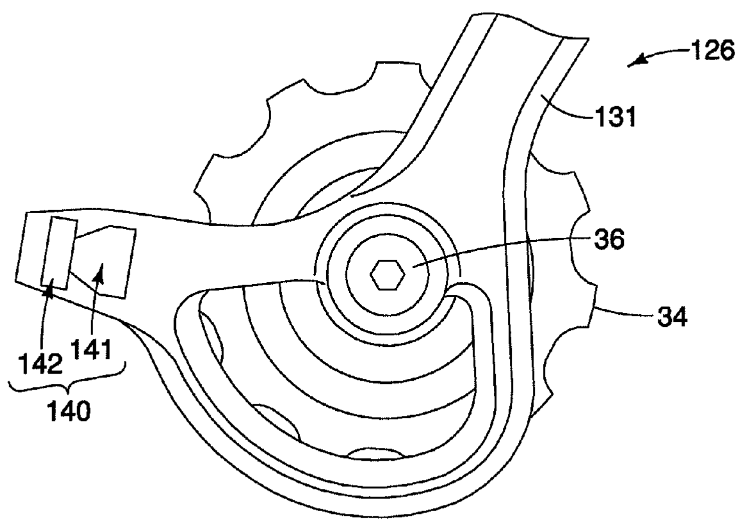
FIG. 7 is a partial outside elevational view of a lower portion of an alternate chain guide for the rear derailleur illustrated in FIG. 1 in accordance with a second embodiment.
Figure 8:
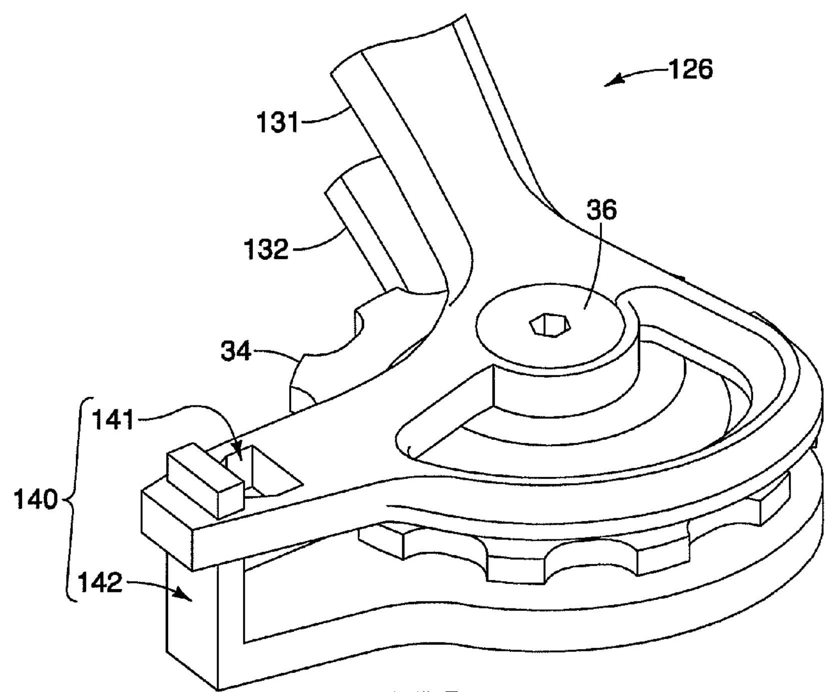
FIG. 8 is a perspective view of the lower portion of the chain guide illustrated in FIG. 7 in accordance with the second embodiment.
Figure 9:
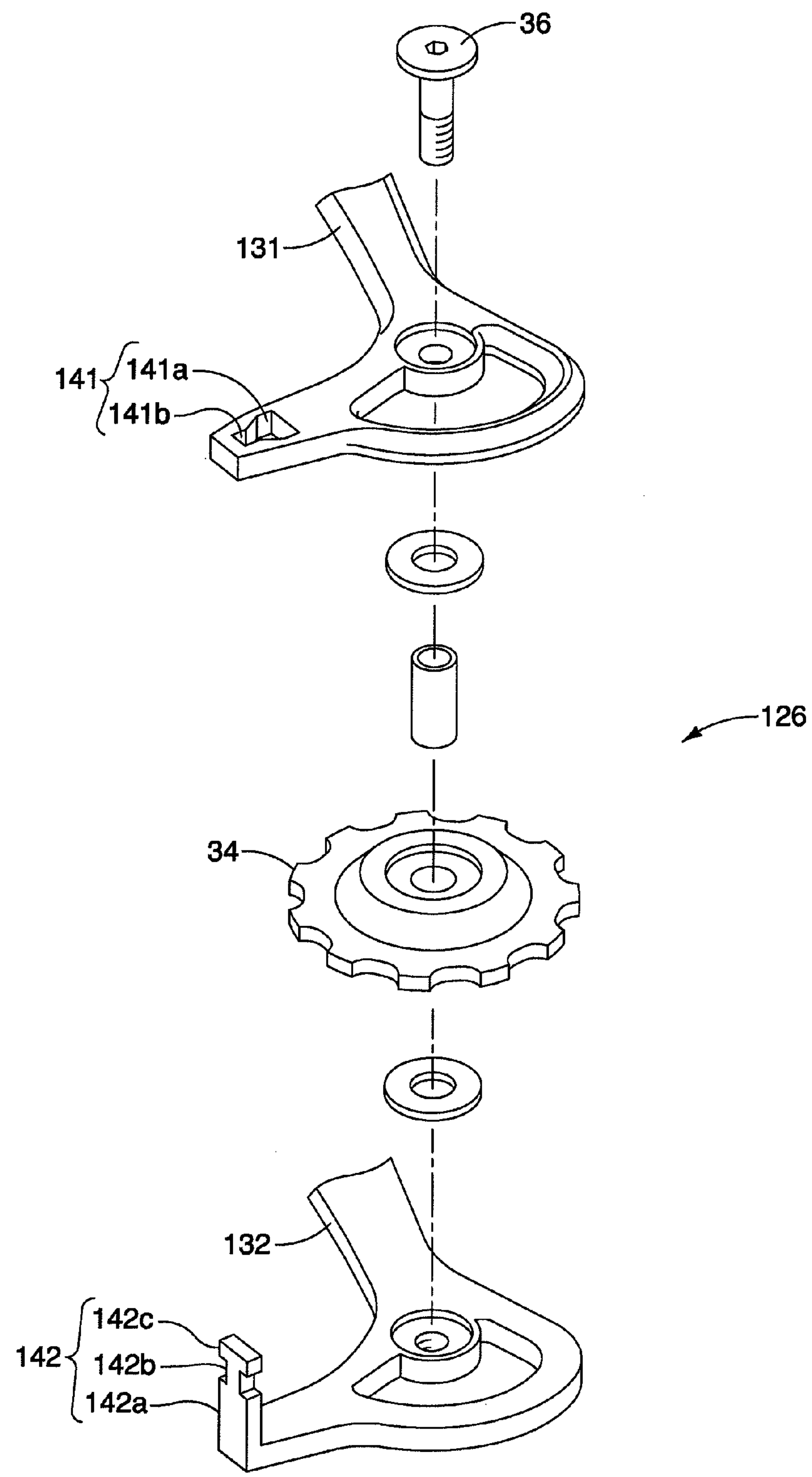
FIG. 9 is an exploded perspective view of the lower portion of the chain guide illustrated in FIGS. 7 and 8 in accordance with the second embodiment.
Figure 10:
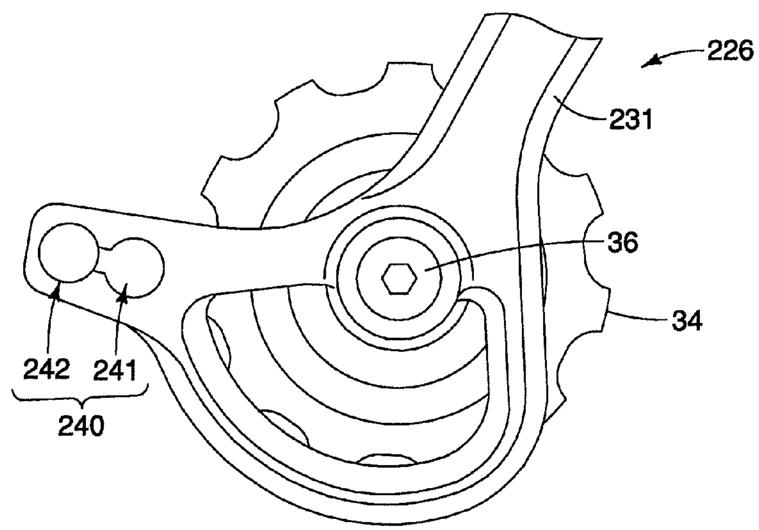
FIG. 10 is an enlarged, partial outside elevational view of a lower portion of the chain guide of the rear derailleur illustrated in FIG. 1 in accordance with a third embodiment.
Figure 11:
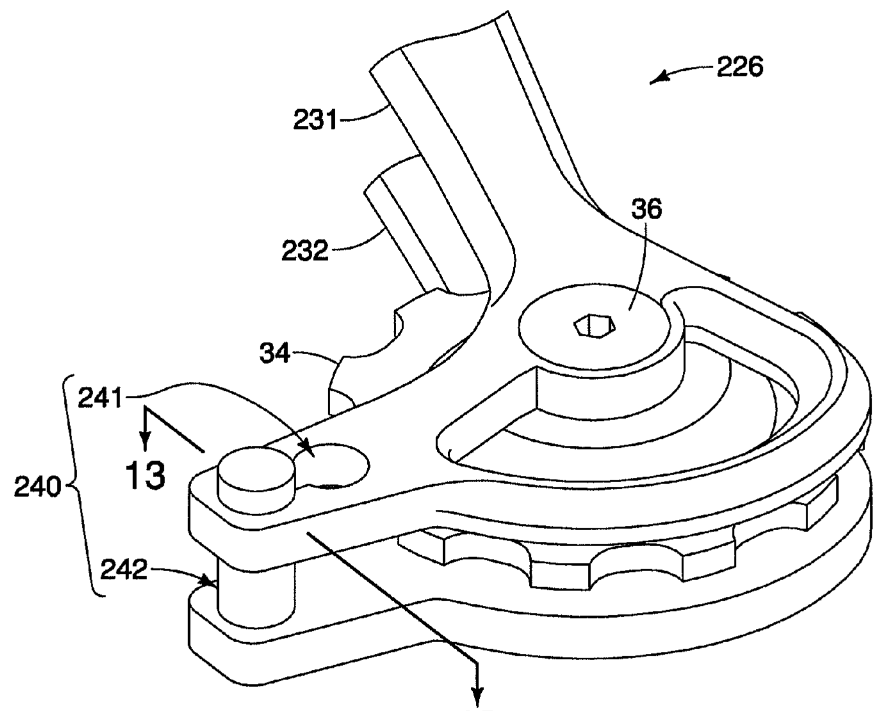
FIG. 11 is a perspective view of the lower portion of the chain guide illustrated in FIG. 10 in accordance with the third embodiment.
Figure 12:
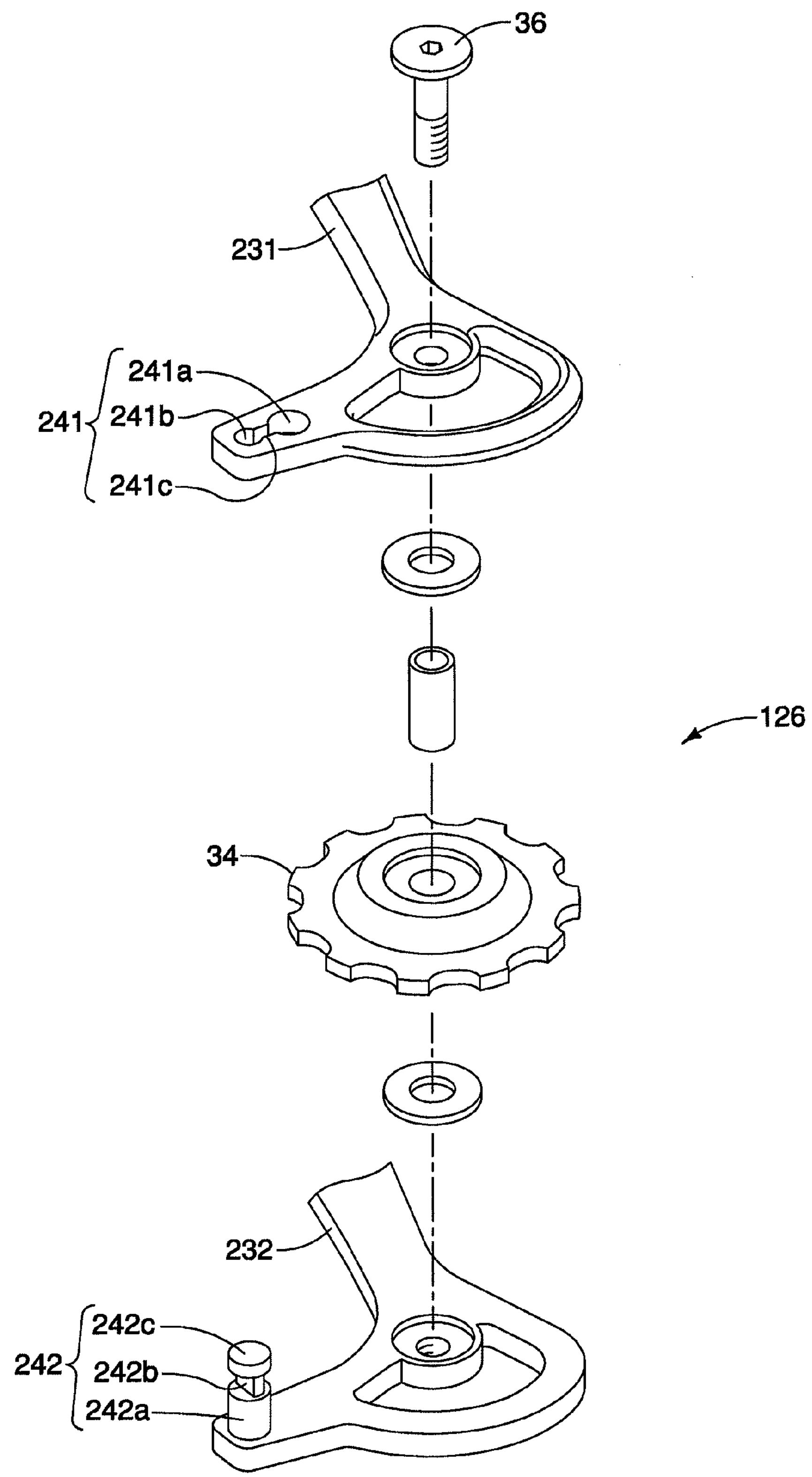
FIG. 12 is an exploded perspective view of the lower portion of the chain guide illustrated in FIGS. 10 and 11 in accordance with the third embodiment.
Figure 13:
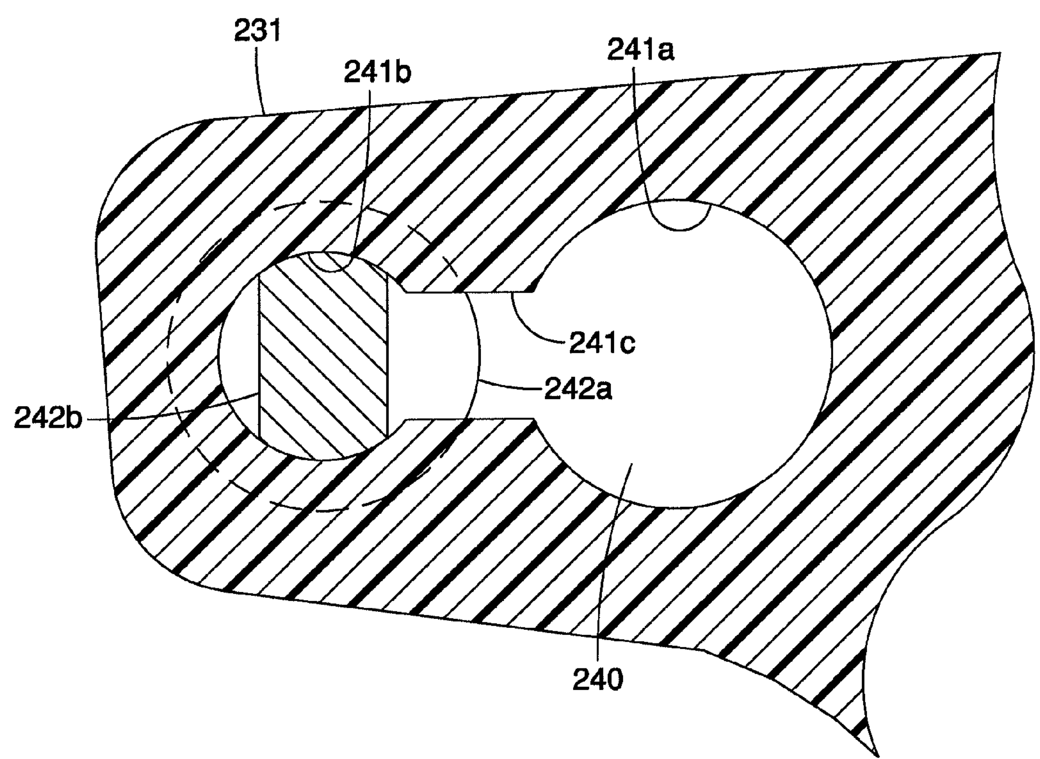
FIG. 13 is a partial cross sectional view of the lower portion of the chain guide illustrated in FIGS. 3 to 5 in accordance with the third embodiment as seen along section line 13-13 of FIG. 11.

Referring now to FIGS. 7 to 9, a modified chain guide 126 is partially illustrated in accordance with a second embodiment. The modified chain guide 126 of this second embodiment is designed to be utilized on the rear derailleur 12 of the first embodiment, in place of the chain guide 26 of the first embodiment. Also, the modified chain guide 126 rotatably supports the guide pulley 33 and the tension pulley 34 via the fasteners 35 and 36 in the same manner as the first embodiment. The only difference between the first and second embodiments is the tool-less connection of the first and second guide plates as discussed below. In view of the similarity between the first and second embodiments, the descriptions of the parts of the second embodiment that are identical to the parts of the first embodiment will be omitted for the sake of brevity.

In this embodiment, the modified chain guide 126 has guide plates 131 and 132 that rotatably support the guide pulley 33 and the tension pulley 34 via the fasteners 35 and 36. Similar to the first embodiment, the guide plates 131 and 132 are also releasably coupled together by a tool-less connection 140 disposed adjacent a peripheral edge of the tension pulley 34. The guide plates 131 and 132 are primarily formed of a non-metallic material. Preferably, the guide plates 131 and 132 are formed of a carbon fiber reinforced plastic.

The tool-less connection 140 of this embodiment basically includes an opening 141 formed in the guide plate 131 and a connecting member 142 fixed to the guide plate 132. The opening 141 formed in the guide plate 131 is a slot that narrows in width as the slot extends from a first wide end to a second narrow end. In particular, the opening 141 formed in the guide plate 131 includes an installation/detachment portion 141*a* disposed at the first wide end of the opening 141, and a retaining portion 141*b* disposed at the second narrow end of the opening 141. The connecting member 142 of this embodiment basically includes a spacer section 142*a*, a reduced width section 142*b* formed by a pair of notches, and an enlarged width section 142*c*. In this embodiment, the connecting member 142 is integrally formed with the guide plate 132 as a one-piece, unitary member. Here, the attachment portion is formed by the reduced width section 142*b* and the enlarged width section 142*c* to define a T-shaped configuration. The guide plate 131 is located within the notches defined by the reduced width section 142*b* when the chain guide 26 is in the assembled state. The basic assembly and disassembly of the guide plates 131 and 132 is the same as the first embodiment.

Referring now to FIGS. 10 to 13, a modified chain guide 226 is partially illustrated in accordance with a third embodiment. The modified chain guide 226 of this third embodiment is designed to be utilized on the rear derailleur 12 of the first embodiment, in place of the chain guide 26 of the first embodiment. Also, the modified chain guide 226 rotatably supports the guide pulley 33 and the tension pulley 34 via the fasteners 35 and 36 in the same manner as the first embodiment. The only difference between the first and third embodiments is the tool-less connection of the first and second guide plates as discussed below. In view of the similarity between the first and third embodiments, the descriptions of the parts of the third embodiment that are identical to the parts of the first embodiment will be omitted for the sake of brevity.

In this embodiment, the modified chain guide 226 has guide plates 231 and 232 that rotatably support the guide pulley 33 and the tension pulley 34 via the fasteners 35 and 36. Similar to the first embodiment, the guide plates 231 and 232 are also releasably coupled together by a tool-less connection 240 disposed adjacent a peripheral edge of the tension pulley 34. The guide plates 231 and 232 are primarily formed of a non-metallic material. Preferably, the guide plates 231 and 232 are formed of a carbon fiber reinforced plastic.

The tool-less connection 240 of this embodiment basically includes an opening 241 formed in the guide plate 231 and a connecting member 242 fixed to the guide plate 232. The opening 241 formed in the guide plate 231 includes an installation/detachment portion 241*a* disposed at a first wide end of the opening 241, and a retaining portion 241*b* disposed at a second narrow end of the opening 241 with a narrower connecting 241*c*. The connecting member 242 of this embodiment basically includes a spacer section 242*a*, a reduced width section 242*b*, and an enlarged width section 242*c*. In this embodiment, the connecting member 242 is fixed to the guide plate 232 in the same manner as in the first embodiment. Here, the attachment portion is formed by the reduced width section 242*b* and the enlarged width section 242*c*. The basic assembly and disassembly of the guide plates 231 and 232 is the same as the first embodiment, except that the guide plates 231 and 232 must also be turned after sliding the connecting member 242 from the installation/detachment portion 241*a* to the retaining portion 241*b* to complete assembly.

GENERAL INTERPRETATION OF TERMS

In understanding the scope of the present invention, the term “comprising” and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “part,” “section,” “portion,” “member” or “element” when used in the singular can have the dual meaning of a single part or a plurality of parts. As used herein to describe the present invention, the following directional terms “forward, rearward, above, downward, vertical, horizontal, below and transverse” as well as any other similar directional terms refer to those directions of a bicycle equipped with the illustrated rear derailleur. Accordingly, these terms, as utilized to describe the present invention should be interpreted relative to a bicycle equipped with the illustrated rear derailleur as used in the normal riding position. Finally, terms of degree such as “substantially”, “about” and “approximately” as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur comprising:

a base member;

a movable member pivotally supporting a chain guide; and a moving mechanism coupled between the base member and the movable member so that the movable member is movable relative to the base member, the chain guide including a first guide plate, a second guide plate, a guide pulley rotatably disposed between the first and second guide plates and a tension pulley rotatably disposed between the first and second guide plates, the first and second guide plates being releasably and directly engaged together by a tool-less connection at a location spaced apart from rotational axes of the guide pulley and the tension pulley.

2. The bicycle rear derailleur as set forth in claim 1, wherein the first and second guide plates are further coupled together by first and second fasteners that are disposed at rotational axes of the guide pulley and the tension pulley.

3. The bicycle rear derailleur as set forth in claim 1, wherein the first and second guide plates are primarily formed of a non-metallic material.

4. The bicycle rear derailleur as set forth in claim 3, wherein the non-metallic material includes a carbon fiber reinforced plastic.

5. The bicycle rear derailleur as set forth in claim 1, wherein the tool-less connection is disposed adjacent a peripheral edge of the tension pulley.

6. A bicycle rear derailleur comprising:

a base member a movable member pivotally supporting a chain guide; and a moving mechanism coupled between the base member and the movable member so that the movable member is movable relative to the base member, the chain guide including a first guide plate, a second guide plate, a guide pulley rotatably disposed between the first and second guide plates and a tension pulley rotatably disposed between the first and second guide plates, the first and second guide plates being releasably coupled together by a tool-less connection, the tool-less connection including an opening formed in the first guide plate and a connecting member fixed to the second guide plate, with the connecting member having an attachment portion that is freely insertable and removable from the opening formed in the first guide plate when the first and second guide plates are in a first orientation with respect to each other and that is retained in the opening formed in the first guide plate when the first and second guide plates are in a second orientation, which is different from the first orientation.

7. The bicycle rear derailleur as set forth in claim 6, wherein the opening formed in the first guide plate includes an installation/detachment portion and a retaining portion, with the installation/detachment portion having a first dimension that releases the attachment portion of the connecting member when in the first orientation and the retaining portion having a second dimension that retains the attachment portion of the connecting member when in the second orientation.

8. The bicycle rear derailleur as set forth in claim 7, wherein the second dimension of the retaining portion of the opening is smaller than the first dimension of the installation/detachment portion of the opening.

9. The bicycle rear derailleur as set forth in claim 6, wherein the opening formed in the first guide plate is a slot that narrows in width from a first end to a second end, with the attachment portion of the connecting member being located at the second end of the slot when the chain guide is in an assembled state.

10. The bicycle rear derailleur as set forth in claim 6, wherein the connecting member further includes a spacer section disposed between inside facing surfaces of the first and second guide plates, and the attachment portion of the connecting member has an enlarged width section and a reduced width section, the enlarged width section being disposed on an outside facing surface of the first guide plate to prevent axially removal of the attachment portion from the opening formed in the first guide plate when the chain guide is in an assembled state, and the reduced width section being arranged to provided for movement of the attachment portion within the opening formed in the first guide plate during assembly and disassembly of the chain guide.

11. The bicycle rear derailleur as set forth in claim 10, wherein the reduced width section is formed by an annular groove.

12. The bicycle rear derailleur as set forth in claim 10, wherein the reduced width section is formed by a pair of notches.

13. The bicycle rear derailleur as set forth in claim 12, wherein the first guide plate is located within the notches when the chain guide is in an assembled state.

14. A chain guide for a bicycle rear derailleur, the chain guide comprising:

a first guide plate;

a second guide plate;

a guide pulley rotatably disposed between the first and second guide plates;

a tension pulley rotatably disposed between the first and second guide plates; and a tool-less connection releasably and directly engaging the first and second guide plates together at a location spaced apart from rotational axes of the guide pulley and the tension pulley.

15. The bicycle rear derailleur as set forth in claim 14, wherein the first and second guide plates are further coupled together by first and second fasteners that are disposed at rotational axes of the guide pulley and the tension pulley.

16. The chain guide as set forth in claim 14, wherein the first and second guide plates are primarily formed of a non-metallic material.

17. The chain guide as set forth in claim 16, wherein the non-metallic material includes a carbon fiber reinforced plastic.

18. The chain guide as set forth in claim 14, wherein the tool-less connection is disposed adjacent a peripheral edge of the tension pulley.

19. A chain guide for a bicycle rear derailleur, the chain guide comprising:

a first guide plate;

a second guide plate;

a guide pulley rotatably disposed between the first and second guide plates;

a tension pulley rotatably disposed between the first and second guide plates; and a tool-less connection releasably coupling the first and second guide plates together, the tool-less connection including an opening formed in the first guide plate and a connecting member fixed to the second guide plate, with the connecting member having an attachment portion that is freely insertable and removable from the opening formed in the first guide plate when the first and second guide plates are in a first orientation with respect to each other and that is retained in the opening formed in the first guide plate when the first and second guide plates are in a second orientation, which is different from the first orientation.

20. The chain guide as set forth in claim 19, wherein the opening formed in the first guide plate includes an installation/detachment portion and a retaining portion, with the installation/detachment portion having a first dimension that releases the attachment portion of the connecting member when in the first orientation and the retaining portion having a second dimension that retains the attachment portion of the connecting member when in the second orientation.

21. The chain guide as set forth in claim 20, wherein the second dimension of the retaining portion of the opening is smaller than the first dimension of the installation/detachment portion of the opening.

22. The chain guide as set forth in claim 19, wherein the opening formed in the first guide plate is a slot that narrows in width from a first end to a second end, with the attachment portion of the connecting member being located at the second end of the slot when the chain guide is in an assembled state.

23. The chain guide as set forth in claim 19, wherein the connecting member further includes a spacer section disposed between inside facing surfaces of the first and second guide plates, and the attachment portion of the connecting member has an enlarged width section and a reduced width section, the enlarged width section being disposed on an outside facing surface of the first guide plate to prevent axially removal of the attachment portion from the opening formed in the first guide plate when the chain guide is in an assembled state, and the reduced width section being arranged to provided for movement of the attachment portion within the opening formed in the first guide plate during assembly and disassembly of the chain guide.

24. The chain guide as set forth in claim 23, wherein the reduced width section is formed by an annular groove.

25. The chain guide as set forth in claim 23, wherein the reduced width section is formed by a pair of notches.

26. The chain guide as set forth in claim 25, wherein the first guide plate is located within the notches when the chain guide is in an assembled state.

* * * * *